United States Patent [19]
Pape et al.

[11] Patent Number: 5,874,161
[45] Date of Patent: *Feb. 23, 1999

[54] PLAIN SURFACE ACOUSTICAL PRODUCT AND COATING THEREFOR

[75] Inventors: James D. Pape; Darryl L. Sensenig, both of Mountville, Pa.

[73] Assignee: Armstrong World Industries, Inc., Lancaster, Pa.

[ * ] Notice: This patent issued on a continued prosecution application filed under 37 CFR 1.53(d), and is subject to the twenty year patent term provisions of 35 U.S.C. 154(a)(2).

[21] Appl. No.: 555,386

[22] Filed: Nov. 9, 1995

[51] Int. Cl.$^6$ ........................................... B32B 5/16
[52] U.S. Cl. .................. 428/206; 428/207; 428/219; 428/341; 428/342; 442/76; 106/816; 106/817; 181/293
[58] Field of Search ..................... 428/206, 207, 428/219, 245, 240, 288, 289, 304.4, 311.1, 311.5, 317.9, 341, 342; 440/76; 106/816, 817; 181/293

[56] References Cited

U.S. PATENT DOCUMENTS 3,583,522  6/1971  Rohweder et al. .
3,755,238  8/1973  Wiita .
4,162,342  7/1979  Schwartz ................................ 428/159

FOREIGN PATENT DOCUMENTS 1144767  3/1969  United Kingdom .

*Primary Examiner*—Marion McCamish
*Assistant Examiner*—Elizabeth M. Cole

[57] ABSTRACT

This invention describes two products both with a plain, nonperforated surface visual consisting of a fiberboard substrate with or without a laminated porous nonwoven scrim and then a finished painted surface. The finish painted surface decorates or finishes the board, but most important, must remain acoustically transparent to retain the sound absorption properties of the fiberboard prior to painting. The fiberboard substrate is made to be porous or modified with hole perforations to cause it to be a good sound absorber. If the fiberboard substrate is sufficiently porous without hole perforations, then the sprayable, high solids, porous paint can be directly applied. If hole perforations are used to improve the sound absorption properties of the board substrate, then a porous, nonwoven scrim is attached and painted using the same high solids porous paint. This painted scrim must be sufficiently optically opaque to hide the hole punched board, yet sufficiently open to render it acoustically transparent. The inventions also include the paint coating alone or the paint/scrim coating alone.

20 Claims, 1 Drawing Sheet

PLAIN SURFACE ACOUSTICAL PRODUCT AND COATING THEREFOR

BACKGROUND OF THE INVENTION

Field of the Invention

The invention is directed to an improved acoustical fiberboard and the coating therefor. Methods for obtaining high noise reduction coefficients (NRC) are well known. NRC values are secured by using ASTM test C423-90a to measure the NRC of a product. Fiberglass is known to be a good sound absorber since it has high porosity. It can be decorated with a surface layer of laminated fabrics or painted scrims requiring only a minimal openness in the surface layer for sound to pass through and be absorbed in the substrate.

To make an acoustically high NRC (=or>65) product using a wood or mineral fiberboard substrate, the board porosity must be high. Finish paint applied directly to the board also must not form a continuous film closing off the board surface. Normally this occurs thus lowering the NRC. A method generally used to increase the NRC is hole punching and surface perforations.

The desired product herein is to have a high NRC with a plain, nonperforated surface visual. If a sanded and painted fiberboard without surface perforations and scrim is the construction, then the porosity of the paint layer must be equal or greater than the porosity of the board in order to retain the sound absorption properties of the board. The special paint that enables high application rates providing adequate coverage while remaining porous is the subject of this invention. Attaining a high porosity and NRC=or>65 is not easily accomplished with fiberboard without sacrificing other material properties such as strength and hardness.

If hole punching the fiberboard is needed to achieve the NRC=or>65, then a facing layer is necessary in order to make a plain, nonperforated surface visual. Porous nonwoven scrims are attached for this purpose. Again a special paint is necessary to cover the scrim to make it optically opaque. Opacity is needed to hide the holes yet it must be acoustically transparent. The combination of the scrim and special paint herein is also the subject of this invention.

SUMMARY OF THE INVENTION

This invention describes a plain, fine textured product consisting of a wood or mineral fiber substrate having a high NRC (=or>65) and a surfacing that does not alter the substrate sound absorption characteristics. The surfacing described herein is intended to render a product having a plain surface without visible holes or surface perforations. This surface layer can be a directly applied paint or an attached painted nonwoven scrim. The critical characteristic of this surfacing is that it is acoustically transparent so that the sound can penetrate through the surface and be absorbed in the substrate.

Paints are generally designed and applied at sufficient rates to form a continuous film. Atomized paint droplets coalesce and normally flow, and wick on the substrate to spread over the surface forming a film. This same type of wicking and spreading occurs when painting porous scrims. Retaining acoustical transparency of the surface can be attained by applying small amounts of paint insufficient to form a film, but these small amounts are not optically opaque. Another method is to use a paint having minimal wicking and spreading characteristics. More paint can then be applied without closing off the surface. If hole perforations are needed to develop the desired NRC, these holes can be hidden by applying a porous nonwoven scrim to the board surface bridging the holes and then painted with an acoustically porous paint.

An invention herein describes a paint which has restricted flow properties and minimized coalescence when applied, thus retaining discrete paint droplets. This is accomplished with a critically high solids/low liquid suspension ranging up to about 72% solids by weight which increases viscosity quickly with minimal water loss. The paint also has to have a greater affinity for itself than for the surface to which it is applied. A conventional fine particle with a mesh size equal to or greater than 325 is used with the paint while retaining a relatively low viscosity of about 3000–9000 cps. Particles that can be used are limestone, glass beads, silica, perlite, etc. The fine particles cause the liquids and fine filler particles to hold to each other by surface tension. This prevents wicking of the droplets into the surface of the fiberboard or the scrim. The combination of the paint and scrim is another invention herein. The combination of the paint or paint and scrim on a fiberboard is another invention herein.

In all three inventions, since flow and coalescence of the paint droplets is minimal, this high solids coating remains discontinuous allowing heavier application rates while retaining an openness essential for air and sound passage.

If desired, the porosity of the paint coating could be used to reduce the sound absorption of the fiberboard.

DESCRIPTION OF THE INVENTION

Figure 1:
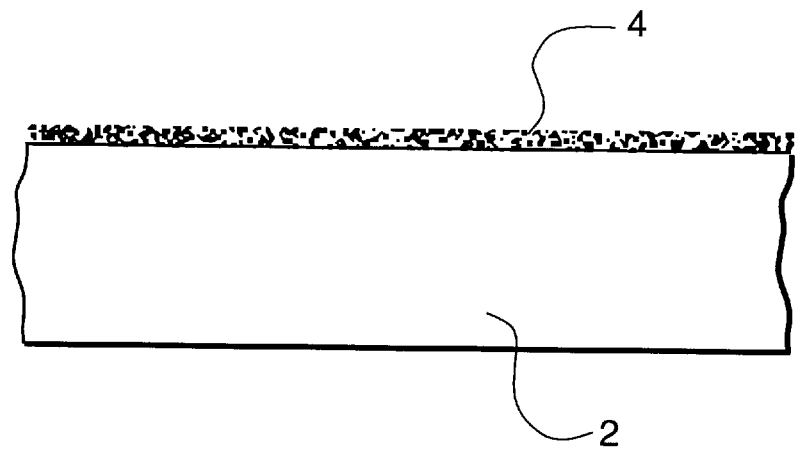
FIG. 1 is a side view of a discontinuous paint coating on a porous fiberboard.

It was determined that paints with a high percent of solids permits significantly higher application rates while retaining openness essential for good air and sound passage into a sound absorbing substrate. By blending extremely fine (325 mesh and finer) limestone, silica, titanium dioxide, binder and water, unusual properties are secured when this suspension is spray applied. The silica filler is used to get the smooth surface and its size is 8 to 20 microns. This paint has minimal wicking and spreading characteristics. Minimal coalescence occurs retaining more discrete individual paint droplets. The liquid and fine fillers have a greater affinity for each other than for the surface to which they are applied. The factor minimizing coalescence of the paint droplets is the critically high solids, so that with minimal water loss the viscosity quickly increases thus setting the droplet and retaining discrete paint droplets. The use of fillers enables up to 72% by weight filled suspensions with viscosity ranging from about 3000–9000 cps, permitting spray application via air atomized guns. The amount of fillers and known viscosity altering agents will permit other viscosity ranges higher or lower than above.

The preferred formulation at present for the paint is as follows:

| Ingredients | % By Weight | Range % |
|---|---|---|
| Binder-Hycar Acrylic latex emulsion 50% solids by weight - B. F. Goodrich | 7.2 | 4–20 |
| Filler-Omyacarb slurry limestone 70% solids by weight - Omya Corp. | 81.0 | 65–85 |
| Silica Filler - Celatom MW-27 100% solids by weight - Harcross Chemicals | 7.0 | 4–10 |

-continued

| Ingredients | % By Weight | Range % |
|---|---|---|
| Filler-Titanium dioxide 100% solids | 1.7 | 1–10 |
| Liquid-Water | 3.1 | 2–8 |
| | 100.00 | 100.00 |

When this paint is spray applied, a smooth surface is formed. There is a limit to the amount of paint that can be applied while still retaining an openness for air and sound passage to the substrate. Higher application rates can be applied to materials which absorb water from the paint droplet more quickly. Rapid absorption minimizes flow and the unwanted formation of a continuous film. Paint application rates as high as 60 gm/sf in one coat can be applied to high water absorption wood or mineral fiberboard and very porous nonwoven scrim, while still retaining openness in the paint layer essential for good air and sound passage.

As the fiberboard or nonwoven scrim becomes less porous, the amount of paint has to be reduced since the water in the paint is not as readily absorbed and flooding occurs closing off the fiberboard surface. Between about 30 to 50 gm/sf of paint is generally ideal for retaining sufficient openness in the surface layer while not affecting the sound absorption properties of the substrate.

The above paint formulation can be used on fiberboard substrates made of fibers selected from the group is of wood, mineral, glass and mixtures thereof. The paint has utility as a layer for good air and sound passage. Porosity to air flow is a measure of a materials ability to pass sound. Porosity as measured by the Frazier Airflow Test or its equivalent is necessary for sound passage. The paint coating should have a minimum porosity of not less than 50–75 cfm/square foot. This will than permit a substrate with a NRC rating of 65, having the above paint coating, to still have a NRC rating of 65. Lowering the paint coating porosity to about 25 cfm/square foot would reduce the substrate NRC rating to less than 65.

To obtain structures of very high NRC (>75), one begins by using a very porous wood or mineral fiber substrate plus holes punched therein, if needed, at approximately 2000 small holes/sf. A cellulose paper of 4–5 gm/sf, 15 mils thick and having a porosity of 117 cfm/square foot is laminated to this substrate using a water based adhesive. The scrim is generally of a thickness of 15 mils or thicker. Other scrims that can be used are organic fiber, glass fiber, glass/organic fiber combinations and like materials. The weight of the scrims is generally 6–12 gm/square foot and a porosity of 200–300 cfm/square foot. The cellulose scrim used is made by Ahlstrom Filtration, Inc. as grade 1281 with fibers of a nominal length of 2.5–5.0 mm and nominal diameter of 30–50 microns. The holes are visible through the cellulose scrim. The high solids paint is spray applied using conventional air atomized spray guns. Up to 30 gm/sf of paint can be applied without a decrease in the NRC. The surfacing is optically opaque and acoustically transparent without visible surface perforations.

As the porosity of the paint layer or the paint/scrim combination layer decreases the ability of that layer to pass sound decreases. Each layer has utility in different situations. Less porous paint layers or paint/scrim layers can be compensated for increasing the absorption of the substrate. However, this is usually accompanied by a decrease in the strength and durability of the substrate since substrate density must be decreased to increase its absorption. The most efficient system overall is one in which the absorption loss due to the paint or paint/scrim is minimized. The paint/scrim porosity should not be lower than 65 cfm/square foot. With the above paint coat, the above scrim itself requires a porosity of higher than 100 cfm/square foot.

Figure 2:
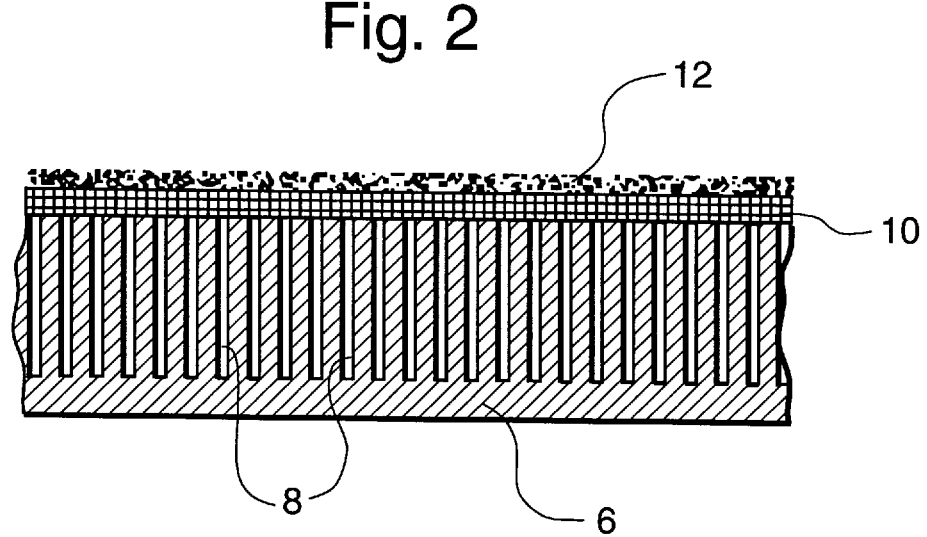
FIG. 2 is a sectional side view of a porous scrim and discontinuous paint coating on a porous perforated fiberboard.

FIG. 1 shows a porous fiberboard substrate 2 with a discontinuous paint coating 4. FIG. 2 shows a hole perforated fiberboard substrate 6 with holes 8. A porous scrim 10 is used with a discontinuous paint coating 12.

What is claimed is:

1. A paint coated fiberboard structure having an acceptable sound absorbing NRC rating comprising:
   (a) a fiberboard base substrate having a visual surface capable of absorbing sound with an NRC rating equal to or greater than 65; and
   (b) a paint coating having up to about 72% solids by weight, said paint coating being applied to said substrate visual surface, said paint coating being an optically opaque, discontinuous, fine textured paint coating that is acoustically transparent to sound when applied to the substrate so that the sound can penetrate through the paint coating and be absorbed in the substrate;
   (c) said paint coating prior to application to the fiberboard structure consisting essentially of:
       (1) a latex,
       (2) very small size inert inorganic filler particles having a size ranging from about 325 mesh and finer, and
       (3) water;
   (d) the water and very small size particles having a greater affinity for each other than the substrate visual surface thereby forming discrete individual paint droplets on the substrate visual surface as an open and discontinuous paint coating.

2. The paint coated fiberboard structure as set forth in claim 1 wherein the fiberboard substrate comprises a fiberboard and a scrim, the scrim being positioned between the paint coating and the fiberboard.

3. The paint coated fiberboard structure as set forth in claim 1 wherein the very small size inert filler particles include limestone particles.

4. The paint coated fiberboard structure as set forth in claim 1 wherein the very small size inert filler particles are selected from the group consisting of limestone, silica and titanium dioxide particles.

5. The paint coated fiberboard structure as set forth in claim 1 wherein the paint coating is about 62 to about 72 percent solids by weight prior to being applied to the fiberboard and the very small inert filler particles include limestone, silica and titanium dioxide particles.

6. The paint coated fiberboard structure as set forth in claim 1 wherein the paint coating is applied to the substrate visual surface at a rate of about 30 to about 60 grams/square foot.

7. A paint coated scrim for use with a sound absorbing substrate comprising:
   (a) a porous scrim having a porosity such that air flow through the porous scrim of not less than about 100 cfm/square foot is obtainable; and
   (b) a fine textured paint coating which prior to application to the scrim has up to about 72% solids by weight and consists essentially of:
       (1) a latex,
       (2) very small size inert inorganic filler particles having a size ranging from about 325 mesh and finer, and
       (3) water;
   (c) the water and very small size particles having a greater affinity for each other than the substrate visual surface thereby forming discrete individual paint droplets on the scrim as an open and discontinuous paint coating.

8. The paint coated scrim as set forth in claim 7 wherein the very small size inert filler particles include limestone particles.

9. The paint coated scrim as set forth in claim 7 wherein the very small size inert filler particles are selected from the group consisting of limestone, silica and titanium dioxide particles.

10. The paint coated scrim as set forth in claim 7 wherein the paint coating is about 62 to about 72 percent solids by weight prior to being applied to the scrim and the very small inert filler particles include of limestone, silica and titanium dioxide particle.

11. The paint coated scrim as set forth in claim 7 wherein the paint coating is applied to the scrim at a rate of about 30 to about 60 grams/square foot.

12. A paint coated fiberboard structure having an acceptable sound absorbing NRC rating comprising:
    (a) a fiberboard base substrate having a visual surface capable of absorbing sound with an NRC rating equal to or greater than 65; and
    (b) a paint coating applied to said substrate visual surface, said paint coating being an optically opaque, discontinuous fine textured paint coating that is acoustically transparent to sound when applied to the substrate so that the sound can penetrate through the paint coating and be absorbed in the substrate;
    (c) said paint coating prior to application to the fiberboard consisting essentially of:
        (1) a latex,
        (2) very small size inert inorganic filler particles having a size ranging from about 325 mesh and finer, and
        (3) water;
    (d) the water and very small size particles having a greater affinity for each other than the substrate visual surface thereby forming discrete individual paint droplets on the substrate visual surface as an open and discontinuous paint coating, and
    (e) the paint coating being about 2.5 to about 12.3 percent by weight of binder, about 60.3 to about 89.5 percent by weight of limestone, about 4.8 to about 17.1 percent by weight of silica and about 1.2 to about 16.3 percent by weight of titanium dioxide after being applied to the fiberboard and drying.

13. A paint coating for use with a sound absorbing substrate wherein
    (a) said paint coating is an optically opaque, discontinuous, fine textured paint coating that is acoustically transparent to sound so that the sound can penetrate through the paint coating when it is applied to the sound absorbing substrate and after drying;
    (b) said paint coating prior to application to the substrate consists essentially of:
        (1) a latex,
        (2) very small size inert filler particles having a size ranging from about 325 mesh and finer, and
        (3) water;
    (c) the water and very small size particles have a greater affinity for each other than the substrate thereby forming discrete individual paint droplets on the substrate as an open and discontinuous paint coating, and
    (d) the paint coating is 4 to 20 percent by weight of binder, 65 to 85 percent by weight of limestone, 4 to 10 percent by weight of silica, 1 to 10 percent by weight of titanium dioxide and 2 to 8 percent by weight of liquid.

14. A paint coating for use with a sound absorbing substrate wherein
    (a) said paint coating is an optically opaque, discontinuous, fine textured paint coating that is acoustically transparent to sound so that the sound can penetrate through the paint coating when it is applied to the sound absorbing substrate and after drying;
    (b) the paint coating is about 62 to about 72 percent solids by weight and consists essentially of:
        (1) a latex,
        (2) very small size inert inorganic filler particles having a size ranging from about 325 mesh and finer, wherein the very small inert filler particles include limestone, silica and titanium dioxide particles and
        (3) water; and
    (c) the water and very small size particles have a greater affinity for each other than the substrate thereby forming discrete individual paint droplets on the substrate as an open and discontinuous coating.

15. A paint coated scrim for use with a sound absorbing substrate comprising:
    (a) a porous scrim having a porosity such that air flow through the porous scrim of not less than about 100 cfm/square foot is obtainable; and
    (b) a fine textured paint coating which prior to application to the scrim consists essentially of:
        (1) a latex,
        (2) very small size inert filler particles having a size ranging from about 325 mesh and finer, and
        (3) water;
    (c) the water and very small size particles having a greater affinity for each other than the substrate visual surface thereby forming discrete individual paint droplets on the scrim as an open and discontinuous paint coating,
    (d) the paint coating being about 2.5 to about 12.3 percent by weight of binder, about 60.3 to about 89.5 percent by weight of limestone, about 4.8 to about 17.1 percent by weight of silica and about 1.2 to about 16.3 percent by weight of titanium dioxide after being applied to the scrim and drying.

16. A paint coated fiberboard structure having an acceptable sound absorbing NRC rating comprising:
    (a) a fiberboard base substrate having a visual surface capable of absorbing sound with an NRC rating equal to or greater than 65; and
    (b) a paint coating having up to about 72% solids by weight, said paint coating being applied to said substrate visual surface, said paint coating when applied to the substrate being an optically opaque, discontinuous, fine textured paint coating that is acoustically transparent to sound so that the sound can penetrate through the paint coating and be absorbed in the substrate;
    (c) said paint coating consisting essentially of:
        (1) a latex resin, and
        (2) very small size inert inorganic filler particles having a size ranging from about 325 mesh and finer,
    (d) the very small size particles forming an open and discontinuous paint coating;
    (e) said paint coating having a porosity such that air flow through the paint coated fiberboard is not less than about 25 cfm/square foot and not more than about 75 cfm/square foot.

17. The paint coated fiberboard structure as set forth in claim 16 wherein the fiberboard substrate comprises a fiberboard and a scrim, the scrim being positioned between the paint coating and the fiberboard.

18. The paint coated fiberboard structure as set forth in claim 16 wherein the very small size inert filler particles include limestone particles.

19. The paint coated fiberboard structure as set forth in claim 16 wherein the very small size inert filler particles are selected from the group consisting of limestone, silica and titanium dioxide particles.

20. A paint coated fiberboard structure having an acceptable sound absorbing NRC rating comprising:
 (a) a fiberboard base substrate having a visual surface capable of absorbing sound with an NRC rating equal to or greater than 65; and
 (b) a paint applied to said substrate visual surface, said paint coating when applied to the substrate being an optically opaque, discontinuous, fine textured paint coating that is acoustically transparent to sound so that the sound can penetrate through the paint coating and be absorbed in the substrate;
 (c) said paint coating consisting essentially of:
  (1) a latex resin, and
  (2) very small size inert filler particles having a size ranging from about 325 mesh and finer,
 (d) the very small size particles forming an open and discontinuous paint coating,
 (e) said paint coating having a porosity such that air flow through the paint coated fiberboard is not less than about 25 cfm/square foot and not more than about 75 cfm/square foot, and
 (f) the paint coating being about 2.5 to about 12.3 percent by weight of latex resin, about 60.3 to about 89.5 percent by weight of limestone, about 4.8 to about 17.1 percent by weight of silica and about 1.2 to about 16.3 percent by weight of titanium dioxide after being applied to the scrim and drying.

* * * * *